United States Patent [19]
Garriette

[11] Patent Number: 5,862,215
[45] Date of Patent: Jan. 19, 1999

[54] PROTECTIVE COVER FOR TELEPHONE MOUTHPIECE AND/OR EARPIECE

[76] Inventor: Ruth A. Garriette, 16200 Ventura Blvd., Suite 302, Encino, Calif. 91436

[21] Appl. No.: 844,829

[22] Filed: Apr. 22, 1997

[51] Int. Cl.⁶ .................................................. H04M 1/00
[52] U.S. Cl. ............................................ 379/452; 379/439
[58] Field of Search .................................... 379/452, 439, 379/451, 437, 447

[56] References Cited

U.S. PATENT DOCUMENTS 5,054,063  10/1991  Lo et al. ................................. 379/452

FOREIGN PATENT DOCUMENTS 2572607  5/1986  France ..................................... 379/452

*Primary Examiner*—Jack Chiang
*Attorney, Agent, or Firm*—William W. Haefliger

[57] ABSTRACT

A protective cover for a telephone receiver mouthpiece or earpiece which comprises a thin, flexible sheet having a bounding perimeter, the sheet shaped and sized to fit over the earpiece or mouthpiece end portion of the receiver; and elastic band structure extending along or near the perimeter to collapse the perimeter adjacent the receiver end portion carrying the earpiece or mouthpiece, for holding the sheet in removable, yet yieldably resilient covering relation to the earpiece or mouthpiece; the sheet sized to loosely cover the receiver end portion.

8 Claims, 4 Drawing Sheets

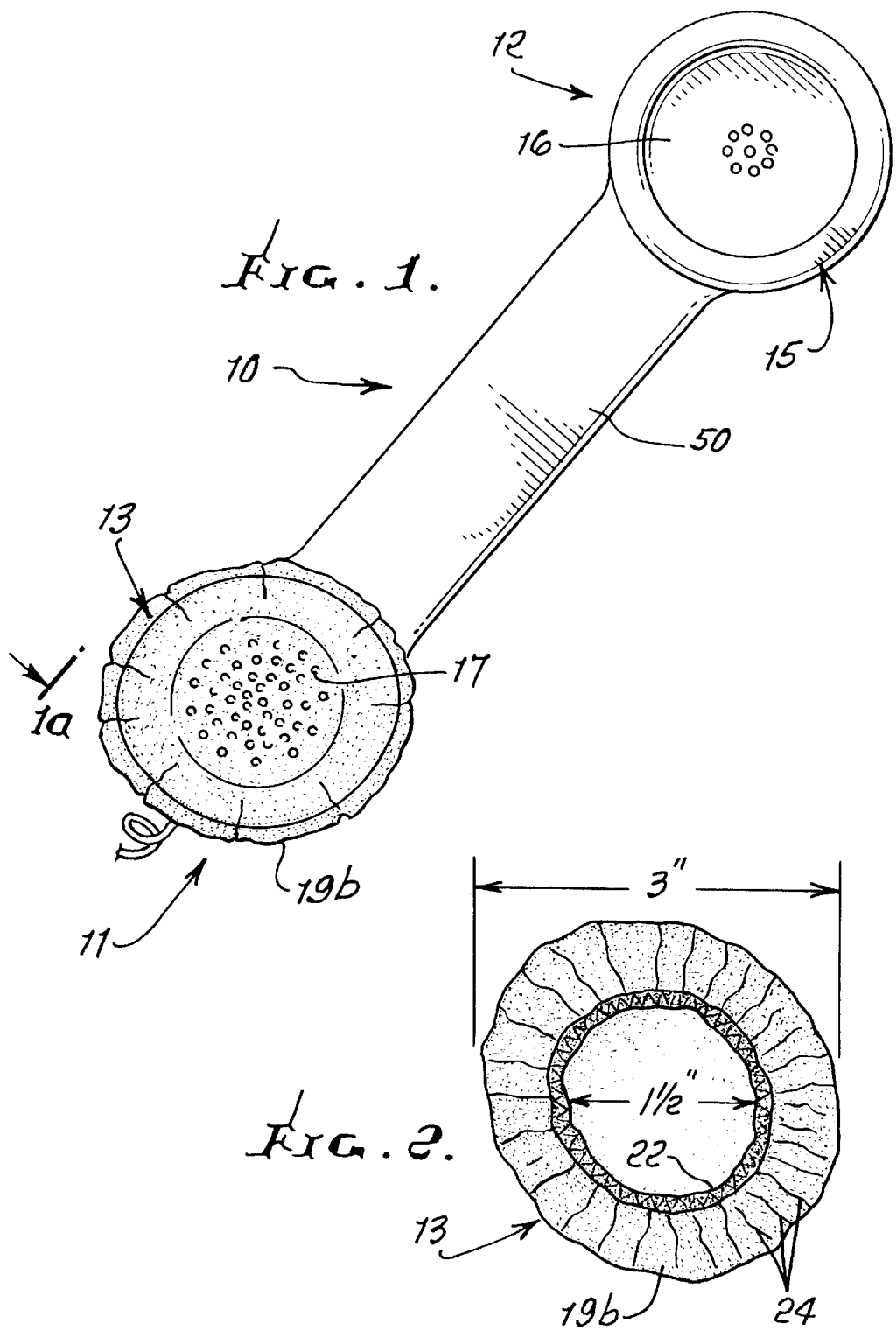

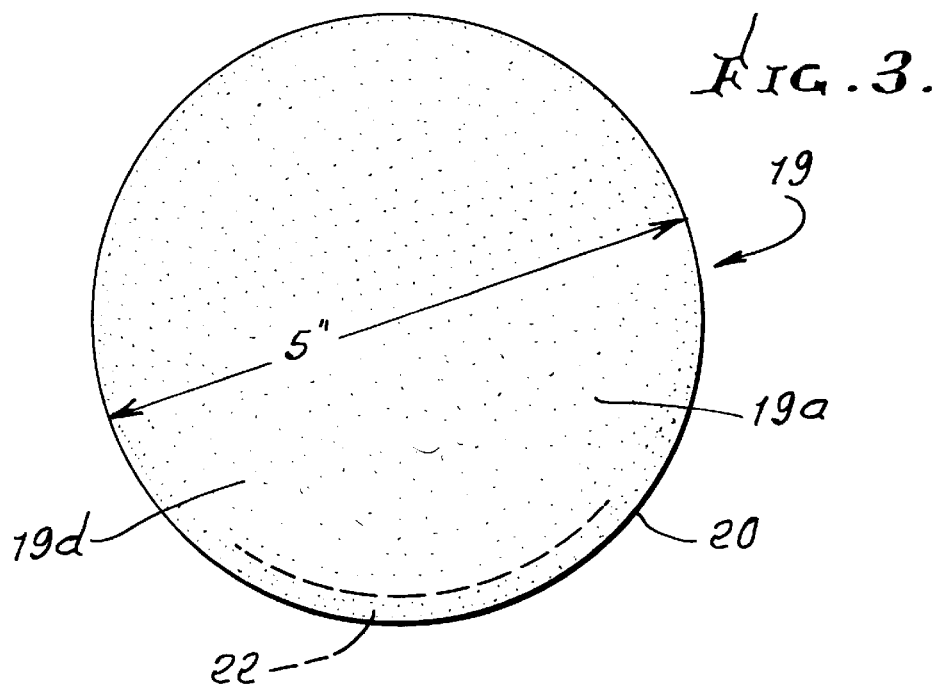
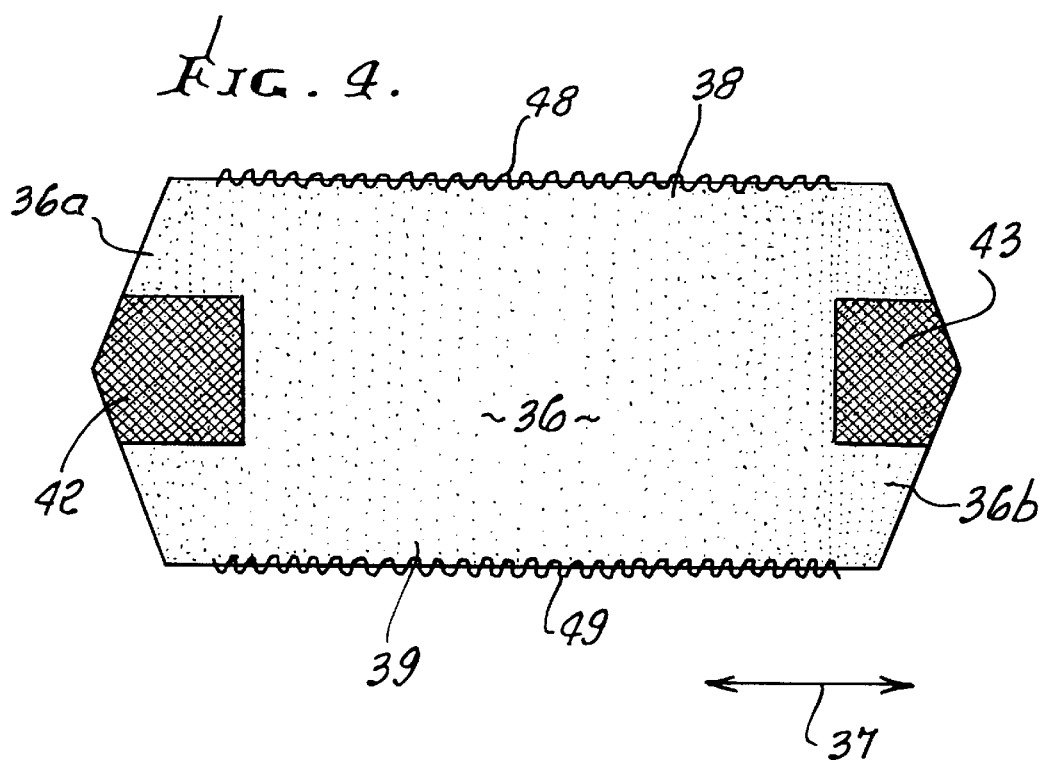

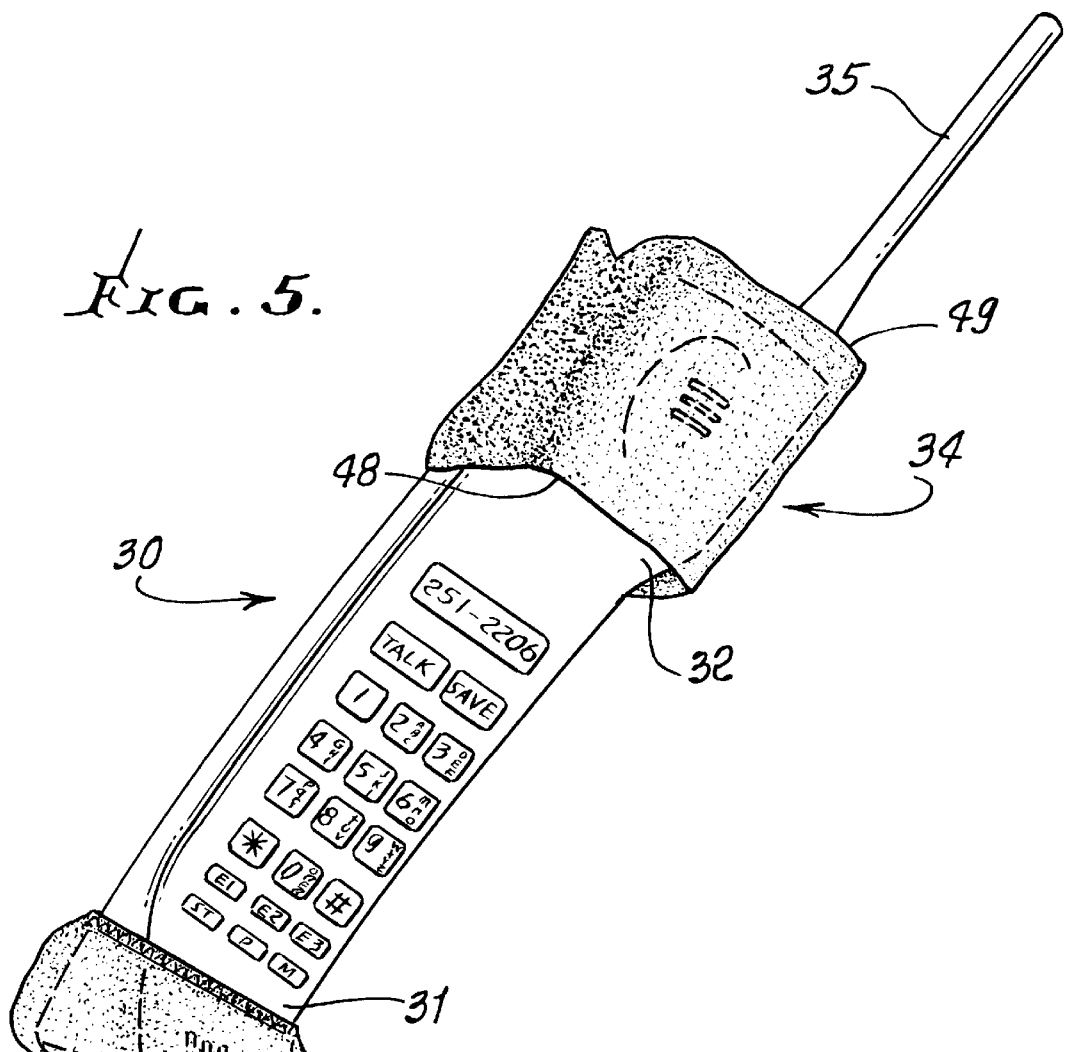
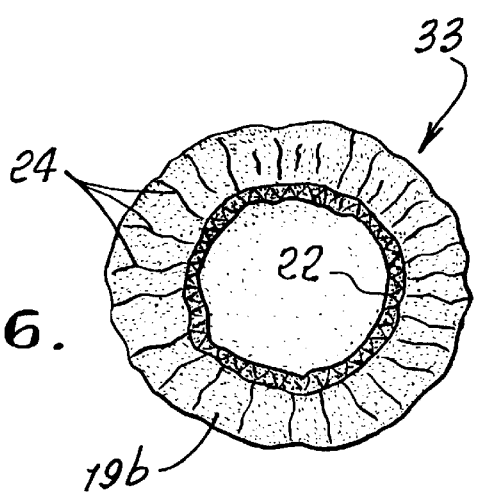

PROTECTIVE COVER FOR TELEPHONE MOUTHPIECE AND/OR EARPIECE

BACKGROUND OF THE INVENTION

This invention relates generally to protective covers for telephone mouthpieces and/or earpieces, and more particularly, to improvements in such covers.

There is continual need for improvements in such mouthpiece and/or earpiece covers. For example, there is need for low-cost, easily applied covers, which readily attach to, and are readily removable from the telephone receivers having different sized mouthpieces and/or earpieces.

SUMMARY OF THE INVENTION

It is a major object of the invention to provide protective covers that will meet the needs referred to above. Basically, the cover described herein comprises:

a) a thin sheet having a bounding perimeter, the sheet shaped and sized to fit over the earpiece or mouthpiece end portion of the receiver, b) and elastic band means extending along or near the perimeter to collapse the perimeter adjacent the receiver end portion carrying the earpiece or mouthpiece, for holding the sheet in removable, yet yieldably resilient covering relation to the earpiece or mouthpiece, c) the sheet sized to loosely cover the receiver end portion.

In one form of the invention, the sheet perimeter has looping configuration, and the elastic band extends in a looping direction, for yieldably collapsing that perimeter to clamp about the telephone receiver end that carries the mouthpiece.

In another form of the invention, the sheet has opposed edges, and wherein the band means extends along the opposed edges. As will appear, those opposed edges may typically extend in generally parallel relation, retention means is provided on the sheet and spaced from the band means to retain the sheet to the earpiece or mouthpiece, with the band means in partially stretched condition; and the retention means may comprise spaced hook and pile, i.e., VELCRO, zones on the sheet that are pressed together to hold the elastic band means in partially stretched condition on the earpiece end of a telephone receiver. The cover is disposable.

These and other objects and advantages of the invention, as well as the details of an illustrative embodiment, will be more fully understood from the following specification and drawings, in which:

DRAWING DESCRIPTION

FIG. 1 is a frontal view of a telephone receiver to which one cover of the invention is applied;

FIG. 2 is a frontal view of the cover prior to its application to the telephone receiver;

FIG. 3 is a front view of a cover sheet blank;

FIG. 4 is a front view of another form of cover sheet blank, but with band means and retention means applied;

FIG. 5 is a perspective view of another form of telephone receiver, with two different types of covers applied; and FIG. 6 is a view like FIG. 2 showing one of the covers, as used in FIG. 5, but prior to its application to the receiver.

DETAILED DESCRIPTION

Figure 1A:
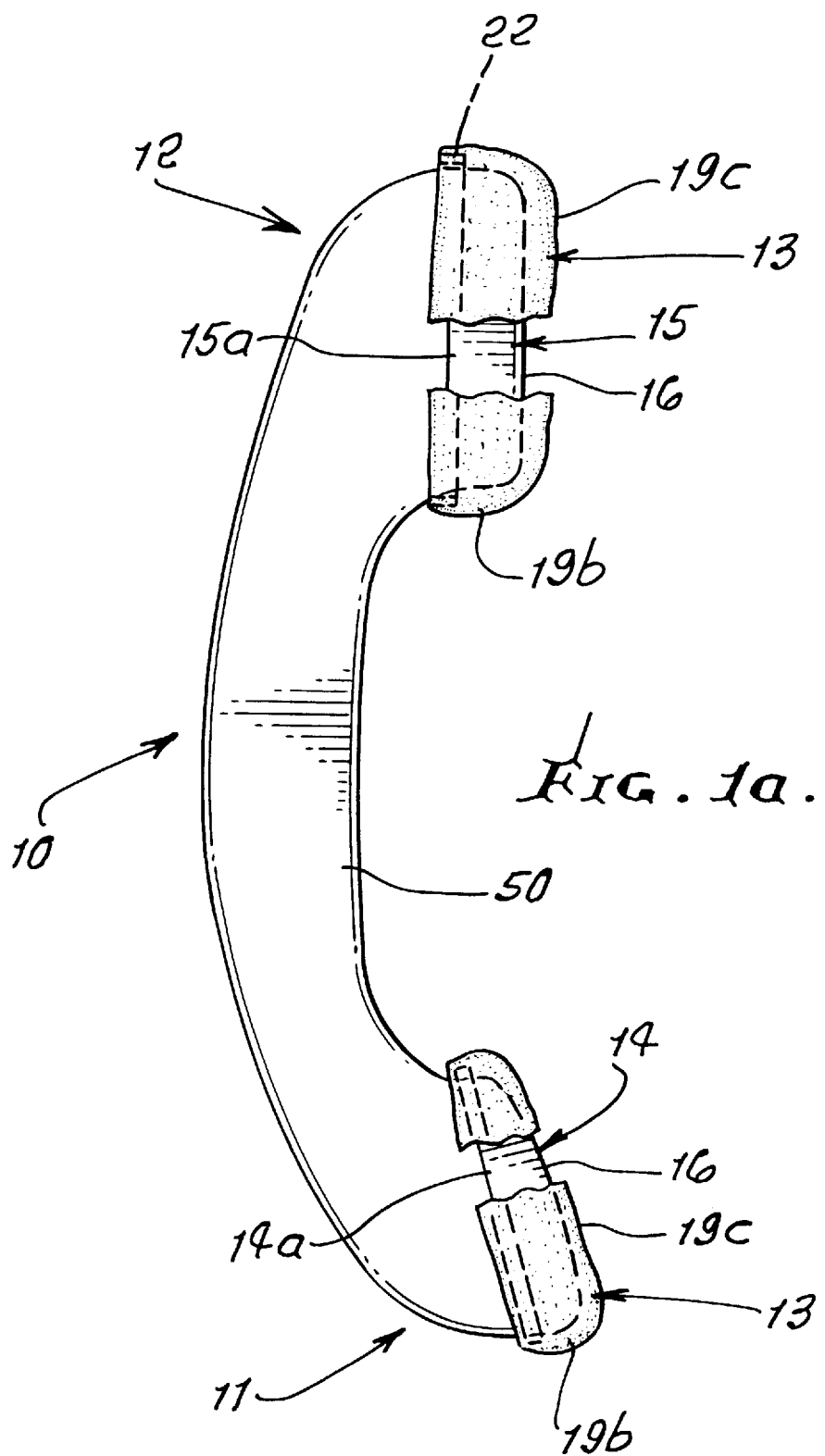
FIG. 1a is a side view taken on lines 1a—1a of FIG. 1.

In FIGS. 1 and 2, a telephone receiver 10 has a transmitter, i.e., mouthpiece, end 11, and a receiver, i.e., earpiece, end 12. A handle is shown at 50. These ends may be alike, as shown, and the same protective cover 13 may be applied to either end, or two such covers 13 may be applied, as in FIG. 1a. The mouthpiece cap 14 is like the earpiece cap 15, such caps carrying discs or plates 16 via which sound is transmitted. Note perforations in the discs, as indicated at 17 in FIG. 1.

The protective cover 13 includes a thin, flexible sheet 19, formed as an oval blank 19a seen in FIG. 3. That sheet has a perimeter seen at 20, and the sheet is shaped and sized to fit over the earpiece or mouthpiece end portion of the receiver.

Elastic band means, as for example looping band 22, extends along or near the perimeter 20, to collapse that perimeter, as shown in FIG. 2, wherein which the band is not stretched, and forming a cover skirt 19b. The opening defined by the circularly looping, unstretched band in FIG. 2 is approximately 1½ inches in diameter. Sheet folds are formed in the skirt as indicated at 24. The overall diameter of the flat, collapsed sheet is about 3 inches, as seen in FIG. 2; the front circular portion 19c of the sheet, which forms the folds, partially overlaps the rear portion of the sheet indicated at 19c.

FIG. 1a shows the cover as manually applied to the mouthpiece cap 14, in which condition the looping elastic band 22 is partially expanded to clamp the sheet to the cap annular periphery 14a. See also 15a, of the earpiece cap. Accordingly, the sheet perimeter is collapsed adjacent the receiver end portion carrying the mouthpiece, for holding the mid or main part 19c of the sheet in removable, yet yieldably resilient, covering relation to the mouthpiece. Such coverage is typically loose, so that the cover is easily applied and removed, manually, as by slipping it into and out of position. The sheet, in this regard, advantageously consists of UNIFIL, a non-woven, synthetic resinous material, for example rayon, about 0.005 inches in thickness. UNIFIL is a product of Mid West Filtration Co., Fairfield, Ohio. Such material does not tear and facilitates repeated expansion and collapse without destruction.

FIG. 1a shows two such partially expanded covers 13, which are alike, one applied to the mouthpiece cap, and the other similarly applied to the earpiece cap. Very good sanitary protection is afforded to the user's mouth and ear areas, in an inexpensive manner; and the covers are easily carried in the user's purse or bag, to be applied to a public telephone receiver when a telephone call is to be made. The cover construction also allows its use on different size receiver caps 14 and 15. The covers are readily disposable, after use.

FIG. 5 shows another type telephone unit 30 having non-circular, i.e., block-shaped, transmitter and receiver ends 31 and 32. These are illustrated as encompassed by covers 33 and 34. Cover 33, as seen in FIG. 6 prior to its application to end 31, is like cover 13, as seen in FIG. 2. This shows the versatility of the covers 13 and 33.

Cover 34 is wrapped about the receiver end 32, so as not to interfere with antenna 35. FIG. 4 shows the construction of cover 34. It includes a thin, flexible, plastic sheet 36, which is elongated in longitudinal direction indicated by arrows 37, forming opposed, laterally spaced sheet edges 38 and 39 extending in generally parallel relation, longitudinally. The sheet length is about twice, or near twice, its width.

Retention means is provided on sheet 36 to hold it in wrapped condition, as applied about the receiver (earpiece) end 32 of the phone unit, as seen in FIG. 5. Such retention means may advantageously comprise hook and pile local zones 42 and 43 (VELCRO) on opposite sides of the sheet tapered end zones 36*a* and 36*b*.

Also provided are elastic bands 48 and 49 attached to the sheet to extend along its opposite edges 38 and 39. In FIG. 4, the bands are yieldably stretched to allow the sheet 36 to be shown in fully extended, flat positions. Normally, the bands are unstretched, which foreshortens the sheet, longitudinally. As used on the telephone unit seen in FIG. 5, the elastic bands are partially stretched, and grip the phone unit about its periphery at end 32. Zones 42 and 43 are pressed together, to hold the cover 38 in that condition.

The plastic material of the cover sheets may comprise UNIFIL 60, which has air permeability. Its thickness is about 5 mils, i.e., 0.005 inch.

The covers disclosed herein, including their materials, are well adapted to treatment by the user to sanitize them, as for example at the time of use. Typically, the user can spray the cover with a disinfectant (LYSOL), using a small spray container carried in a purse, or a bag, or pocket, thereby impregnating the material of the cover before (or after) the cover is applied to the telephone receiver, for extra protection.

The invention encompasses this method step, if desired.

I claim:

1. A protective cover for a telephone receiver mouthpiece or earpiece, comprising:

a) a thin, flexible sheet having a bounding perimeter, the sheet shaped and sized to fit over the earpiece or mouthpiece end portion of the receiver, b) and elastic band means extending along or near said perimeter to collapse the perimeter adjacent the receiver end portion carrying the earpiece or mouthpiece, for holding the sheet in removable, yet yieldably resilient covering relation to the earpiece or mouthpiece, c) said sheet sized to loosely cover the receiver end portion, d) said sheet having opposed edges, said band means comprising two spaced, generally parallel, elastic bands that extend along said opposed edges, e) there being retention means on the sheet and spaced from said two elastic bands to retain the sheet to the earpiece or mouthpiece, with said bands in partially stretched condition, f) said retention means comprising hook and pile zones located at opposite end portions of the sheet that are pressed together to hold the elastic hands in partially stretched condition on the earpiece end of a telephone receiver, said hook and pile zones spaced from said two bands.

2. The cover of claim 1 wherein said sheet has a mid-portion spaced inwardly from said perimeter, to fit directly over that perforated side portion of the earpiece or mouthpiece which transmits sound.

3. The cover of claim 2 including the earpiece or mouthpiece to which the sheet is releasably retained, with the elastic band means spaced from that side portion of the earpiece or mouthpiece which transmits sound, the sheet and two elastic bands wrapping about the earpiece or mouthpiece.

4. The cover of claim 3 wherein the elastic band means extends in a partially stretched loop at the exterior of the earpiece or mouthpiece.

5. The cover of claim 3 wherein the sheet extent closest to said band means is gathered in folds, in a loop, adjacent the receiver end portion to which the band means is applied.

6. The cover of claim 1 wherein the sheet consists of synthetic resinous material and has thickness of about 0.005 inch.

7. The cover of claim 1 wherein the sheet has thickness less than 0.01 inch.

8. The cover of claim 1 wherein said sheet carries a spray-applied disinfectant.

* * * * *